(12) United States Patent
Zhao

(10) Patent No.: US 8,561,755 B1
(45) Date of Patent: Oct. 22, 2013

(54) ELECTRONIC DEVICE WITH SPEAKER

(75) Inventor: Bao-Gang Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/600,210

(22) Filed: Aug. 30, 2012

(30) Foreign Application Priority Data

May 23, 2012 (CN) .......................... 2012 1 0161874

(51) Int. Cl.
*H05K 5/00* (2006.01)
(52) U.S. Cl.
USPC ............................ 181/149; 181/148; 381/355
(58) Field of Classification Search
USPC .................................... 181/148, 149; 381/355
See application file for complete search history.

(56) References Cited

U.S. PATENT DOCUMENTS

| | | | |
|---|---|---|---|
| 6,675,930 B2 * | 1/2004 | Sugiyama et al. ............ | 181/148 |
| 6,987,860 B2 * | 1/2006 | Kurihara et al. .............. | 381/386 |
| 7,416,048 B2 * | 8/2008 | Hongo et al. .................. | 181/199 |
| 8,111,855 B2 * | 2/2012 | Chan et al. ..................... | 381/355 |
| 2001/0045320 A1 * | 11/2001 | Sugiyama et al. ............. | 181/153 |
| 2004/0069561 A1 * | 4/2004 | Cox et al. ....................... | 181/199 |
| 2005/0045415 A1 * | 3/2005 | Popken et al. ................. | 181/150 |
| 2006/0037807 A1 * | 2/2006 | Hongo et al. .................. | 181/199 |
| 2006/0060416 A1 * | 3/2006 | Tashiro ......................... | 181/199 |
| 2009/0050402 A1 * | 2/2009 | Shinohara et al. ............ | 181/207 |
| 2009/0100654 A1 * | 4/2009 | Carps ............................ | 24/711.4 |
| 2010/0282536 A1 * | 11/2010 | Carps ............................ | 181/150 |
| 2013/0050591 A1 * | 2/2013 | Kita et al. ...................... | 348/836 |

* cited by examiner

*Primary Examiner* — Forrest M Phillips
(74) *Attorney, Agent, or Firm* — Altis & Wispro Law Group, Inc.

(57) ABSTRACT

An electronic device includes a front frame that includes a planar portion, a first sidewall, and a second sidewall opposite to the first sidewall, the first sidewall and the second sidewall protruding from the planar portion. A back cover is coupled to the front frame. A speaker is attached to the front frame adjacent to the second sidewall of the front frame. The front frame includes several spaced first hooking members arranged on the first sidewall and the back cover includes several spaced second hooking members respectively engaged with the corresponding first hooking members. The first hooking members are used for cooperatively causing a natural frequency of the first sidewall to be greater than a resonance frequency of the speaker, thereby reducing noises caused by resonant vibration of the first sidewall induced by the speaker.

4 Claims, 5 Drawing Sheets

ELECTRONIC DEVICE WITH SPEAKER

BACKGROUND

1. Technical Field

The present disclosure relates to an electronic device with a speaker.

2. Description of Related Art

Many electronic devices such as cellular phones and DVD players include a speaker. The sound quality output from the speaker may be adversely affected by the construction of the housing of the electronic devices. Thus, there is still room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
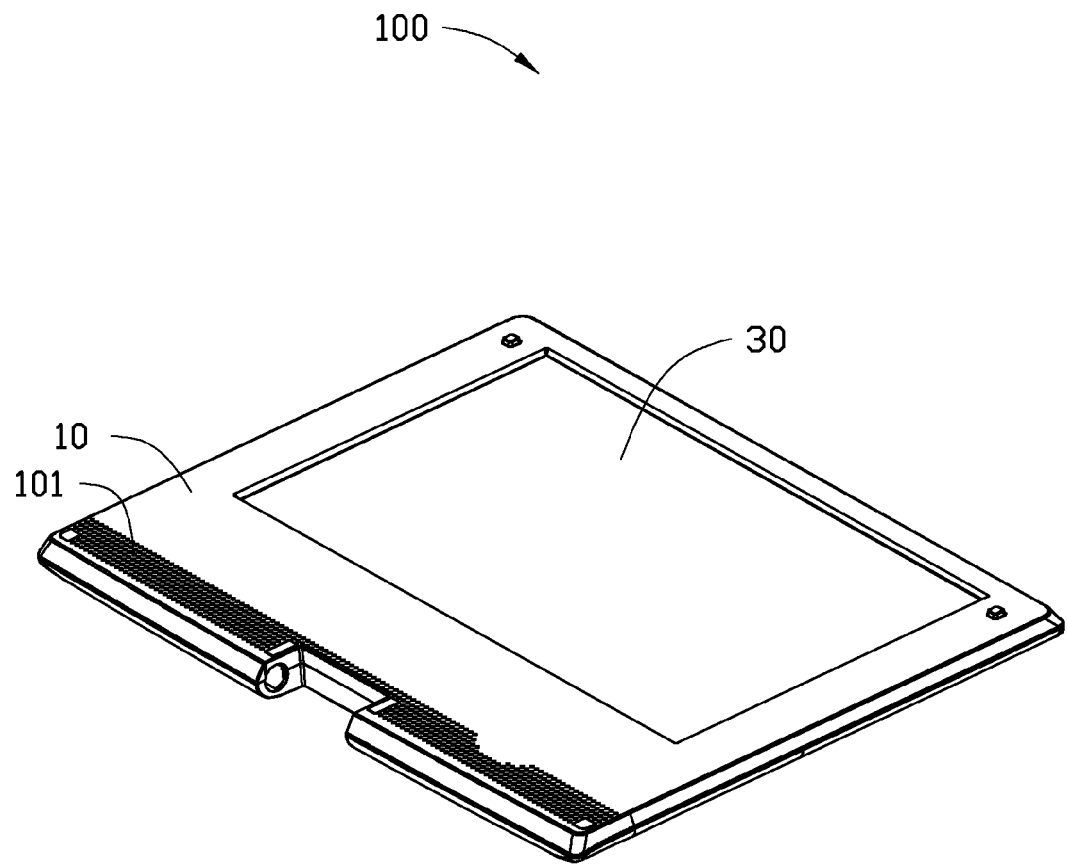
FIG. 1 is an isometric view of an electronic device in accordance with an exemplary embodiment.
Figure 2:
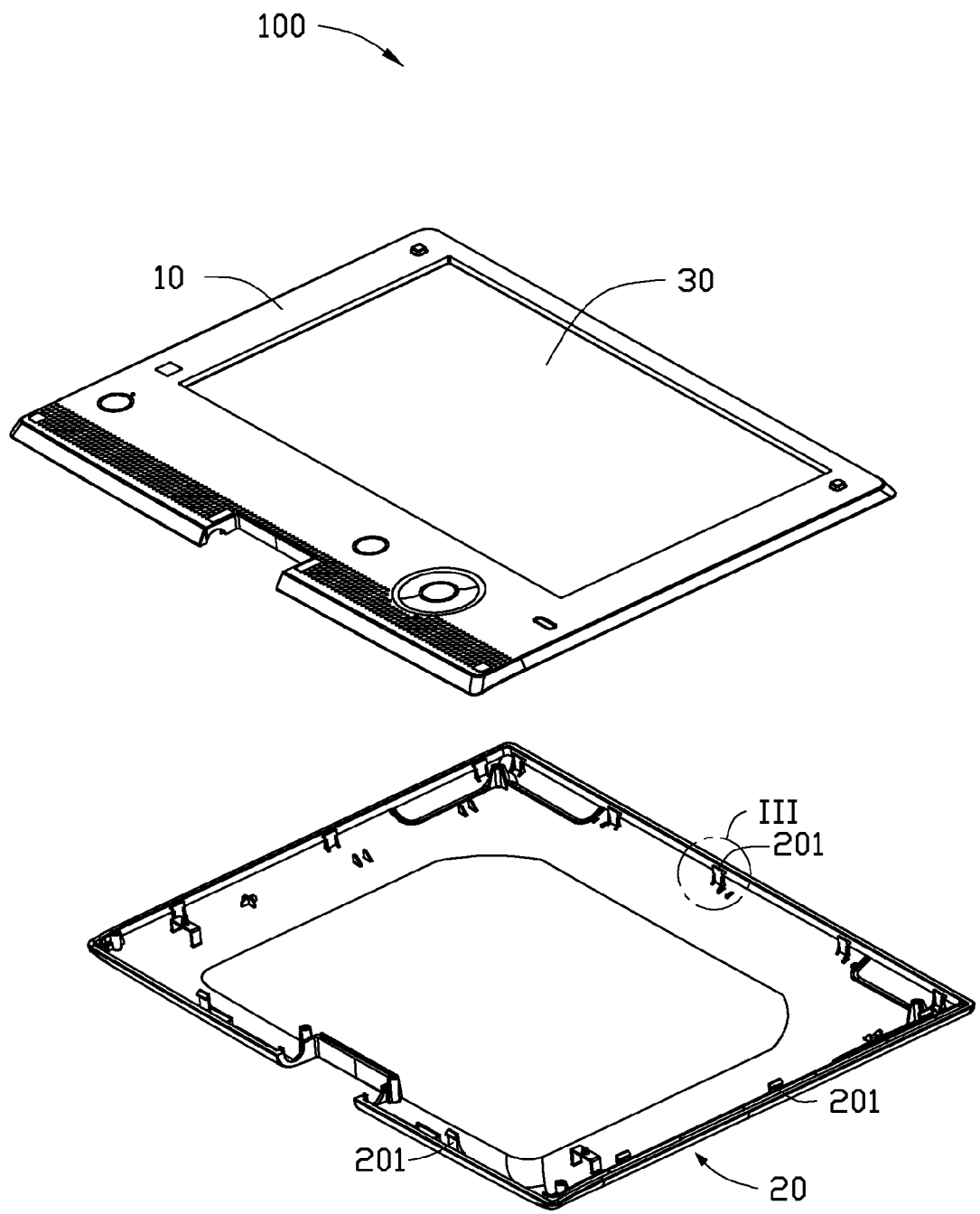
FIG. 2 is an isometric, exploded view of the electronic device of FIG. 1.

Referring to FIGS. 1 and 2, an electronic device 100 includes a front frame 10, a back cover 20 coupled to the front frame 10, and a display panel 30 arranged between the front frame 10 and the back cover 20. The electronic device 100 further includes a speaker 40 (FIG. 4) attached to an inner surface of the front frame 10. The front frame 10 defines a plurality of speaker holes 101 through which sound output from the speaker 40 can travel.

Figure 3:
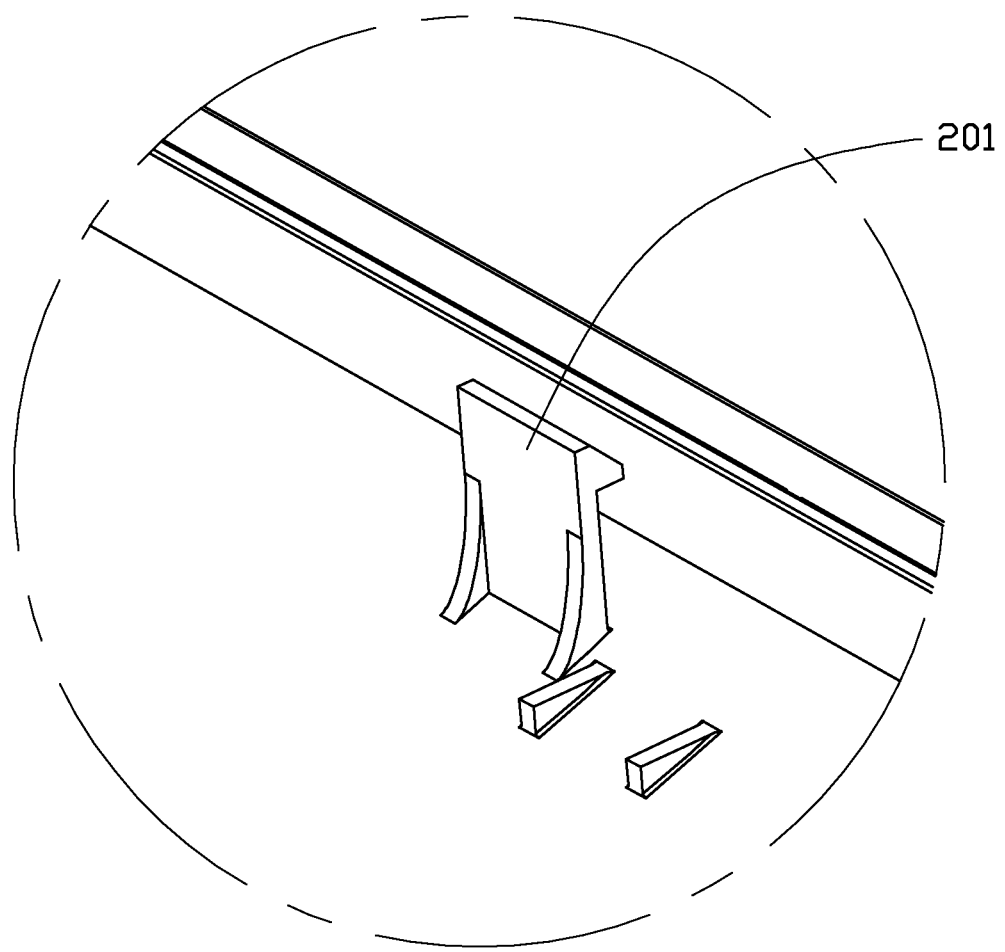
FIG. 3 is an enlarged view of portion III of FIG. 2.
Figure 4:
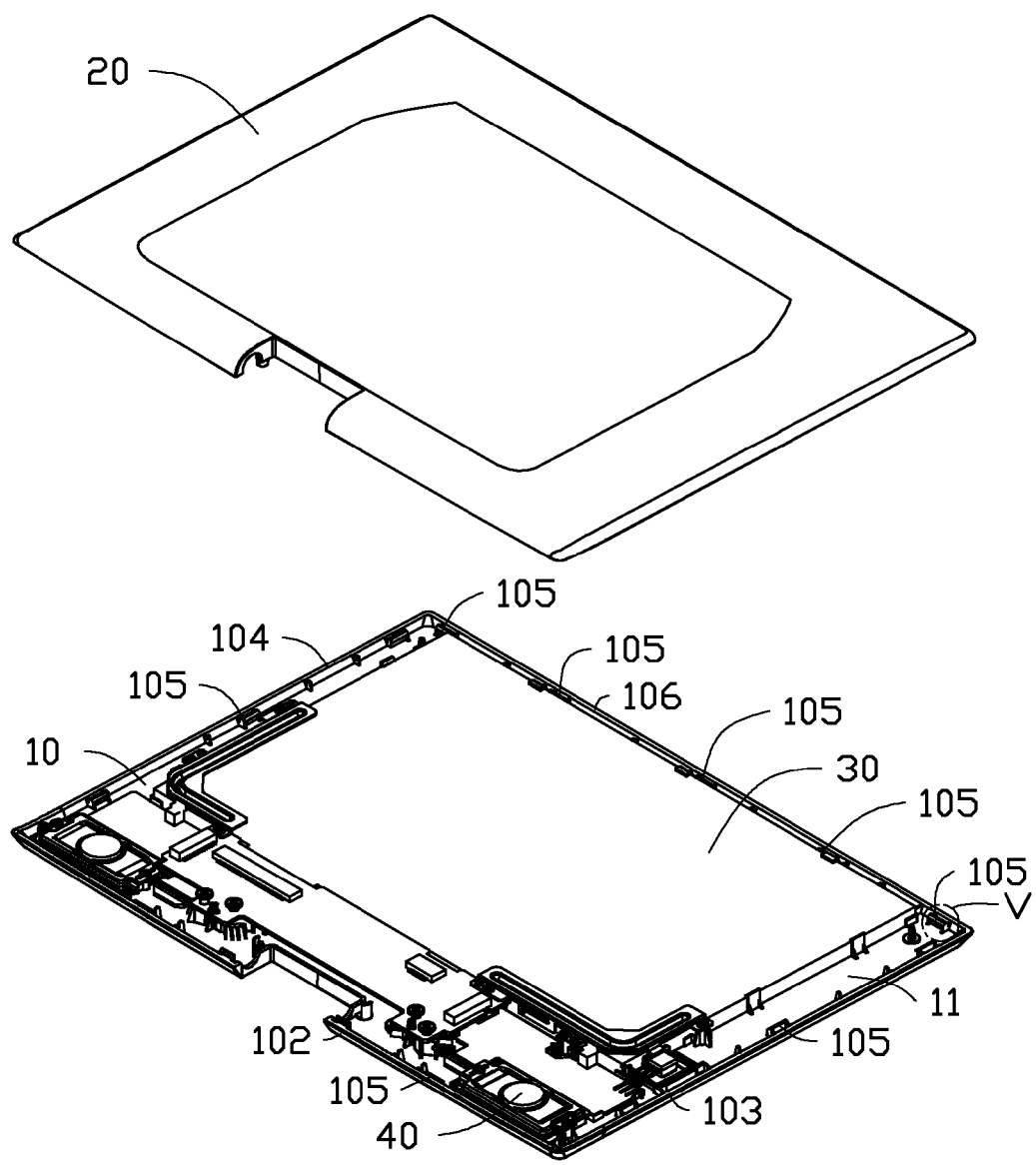
FIG. 4 is similar to FIG. 2, but viewed from another viewpoint.
Figure 5:
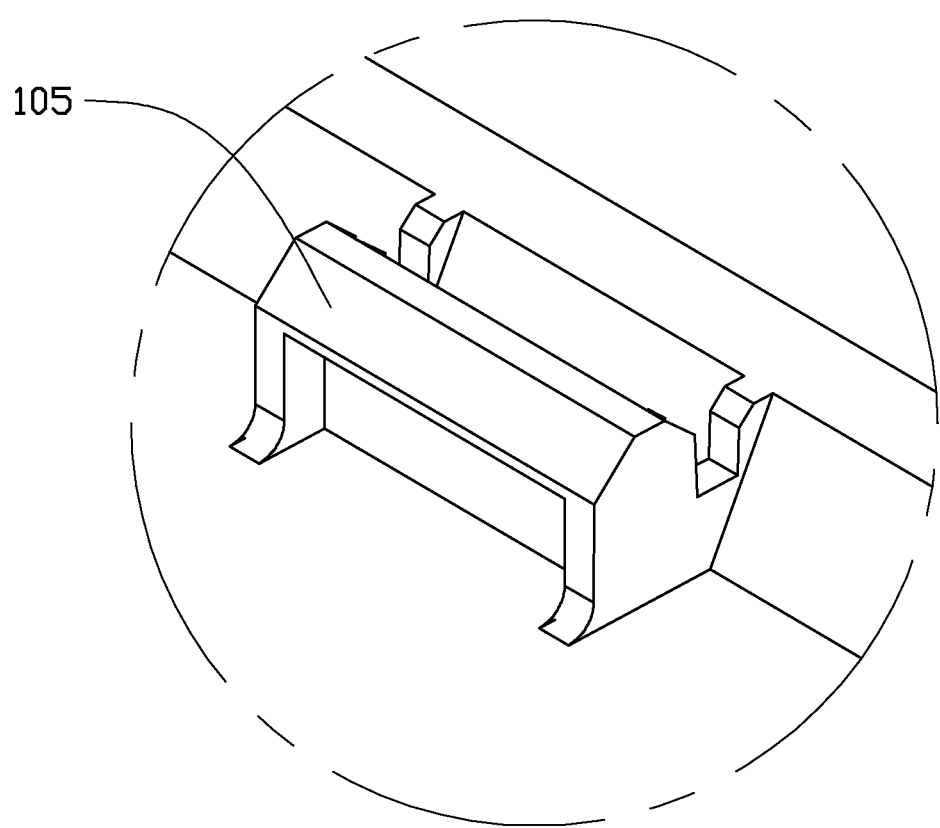
FIG. 5 is an enlarged view of portion V of FIG. 2.

Referring to FIGS. 3-5, the front frame 10 includes a planar portion 11 and four protruding sidewalls 102, 103, 104, and 106 extending along four edges of the planar portion 11. The sidewall 102 is arranged opposite to the sidewall 106, and the sidewall 103 is arranged opposite to the sidewall 104. Opposite ends of the sidewall 103 are respectively connected to first ends of the sidewalls 102 and 106, and opposite ends of the sidewall 104 are respectively connected to the other ends of the sidewalls 102 and 106. The speaker 40 is arranged adjacent to the sidewall 102.

A number of first hooking members 105 are arranged on an inner side of the sidewalls 102, 103, 104, and 106. The back cover 20 includes a number of second hooking members 201 protruding from its inner surface and arranged corresponding to the first hooking members 105. There are an odd number of first hooking members 105 arranged in a straight line along the sidewall 106. In the embodiment, five hooking members 105 are evenly arranged on the inner side of the sidewall 106, and five hooking members 21 are arranged on the inner surface of the back cover 20 correspondingly.

In assembly, the second hooking members 201 are engaged with corresponding first hooking members 105, thereby coupling the front frame 10 to the back cover 20. Tests show that the number of the first hooking members 105 can affect the natural frequency of the sidewall 106. Specifically, when there are five or more hooking members 105, the natural frequency of the sidewall 106 exceeds the resonant frequency of the speaker 40, which can reduce noises caused by resonant vibration of the sidewall 106 induced by the speaker 40.

While various embodiments have been described and illustrated, the disclosure is not to be construed as being limited thereto. Various modifications can be made to the embodiments by those skilled in the art without departing from the true spirit and scope of the present disclosure as defined by the appended claims.

What is claimed is:

1. An electronic device comprising:
   a front frame comprising a planar portion, a first sidewall, and a second sidewall opposite to the first sidewall, the first sidewall and the second sidewall protruding from the planar portion;
   a back cover coupled to the front frame; and
   a speaker attached to the front frame adjacent to the second sidewall of the front frame;
   wherein the front frame comprises a plurality of spaced first hooking members arranged on the first sidewall and the back cover comprises a plurality of spaced second hooking members respectively engaged with the corresponding first hooking members, the first hooking members are configured for cooperatively causing a natural frequency of the first sidewall to be greater than a resonance frequency of the speaker, thereby reducing noises caused by resonant vibration of the first sidewall induced by the speaker.

2. The electronic device according to claim 1, wherein the plurality of first hooking members are arranged along a straight line.

3. The electronic device according to claim 1, wherein the number of the first hooking members arranged on the front frame is equal to or greater than five.

4. The electronic device according to claim 1, wherein the plurality of first hooking members are equidistantly spaced from one another.

* * * * *